United States Patent [19]

Völckers

[11] 4,051,818
[45] Oct. 4, 1977

[54] DEVICE FOR OBTAINING SIGNALS FOR THE CONTROL UNIT OF AN ELECTRONIC FUEL INJECTION SYSTEM

[75] Inventor: Jürgen Völckers, Grussendorf, Germany

[73] Assignee: Volkswagenwerk Aktiengesellschaft, Wolfsburg, Germany

[21] Appl. No.: 627,290

[22] Filed: Oct. 30, 1975

[30] Foreign Application Priority Data

Nov. 23, 1974 Germany .............................. 2455482
Feb. 13, 1975 Germany .............................. 2506078

[51] Int. Cl.² ................................................. F02D 5/00
[52] U.S. Cl. ................................................. 123/32 EA
[58] Field of Search .......... 123/32 EA, 32 EJ, 32 ED

[56] References Cited

U.S. PATENT DOCUMENTS

| 3,693,603 | 9/1972 | Lemanczyk | 123/32 EA X |
| 3,699,935 | 10/1972 | Adler et al. | 123/32 EA X |
| 3,915,134 | 10/1975 | Young et al. | 123/119 A |
| 3,927,304 | 12/1975 | Wentworth et al. | 123/32 EA X |
| 3,973,529 | 8/1976 | Wessel et al. | 123/32 EA |

Primary Examiner—Alan Cohan
Assistant Examiner—Gerald Michalsky
Attorney, Agent, or Firm—Brumbaugh, Graves, Donohue & Raymond

[57] ABSTRACT

A device modifies the signals for the control unit of an electronic fuel injection system of an internal combustion engine in order to reduce lengthwise vehicle vibrations. The signals are derived from a tachometer that measures the engine speed and a gauge that measures the air flow supply to the engine. The device dampens the a.c. components in the signal either symmetrically or asymmetrically. This device can be in the form of a passive RC circuit with diodes to determine the operating points or it can be an active circuit.

10 Claims, 4 Drawing Figures

DEVICE FOR OBTAINING SIGNALS FOR THE CONTROL UNIT OF AN ELECTRONIC FUEL INJECTION SYSTEM

BACKGROUND OF THE INVENTION

The invention relates to a device for obtaining signals to be applied to the control unit of an electronic fuel injection system of an internal combustion engine from a tachometer for measuring the engine speed and a gauge for measuring the air flow supply to the engine or the intake air pressure.

Electronic fuel injection system for internal combustion engines, in various embodiments and operating on various principles, are well known. For example, articles in the *Motortechnische Zeitschrift* 34 (1973) 1, page 7, and 4, page 99, describe electronic gasoline injection systems operating with an airflow gauge, where the control unit is supplied with rotational speed signals obtained from ignition impulses of the engine. Articles in the *Automobilitechnische Zeitschrift* 72 (1971) 4, page 125; *Bosch Technische Berichte* 2, No. 3, November 1967, page 107; and *Bosch Technische Zeitschrift* 3, No. 1, November 1969, page 3, describe fuel injection systems in which the rotational speed signals are obtained by means of additional contacts on the ignition distributor. In the fuel injection systems according to the references first mentioned, the control unit forms the quotient of the airflow measurement and the speed signal to obtain a signal proportional to the injection time. However, in the systems described in the articles last mentioned, the speed is only a correction factor.

Certain vehicles equipped with fuel injection have unexplained lengthwise vehicle vibrations that appear under some operating conditions, for example in the engine brake mode or under partial load. Even more mysteriously, this vibration tendency does not occur in all vehicles of the same type and occurs in different degrees among vehicles of the same type.

As has been learned, short-term variations in the speed of the engine, such as positive or negative speed variations or irregularities, due to various causes, as for example unevennesses in the roadway or even electrical interference in the ignition from the outside, may cause changes in the injection time by way of the speed feedback in the fuel injection control unit. This leads in turn to fluctuations in the torque delivered by the engine, because of changes in the proportion of air. The extent to which such fluctuations in delivered torque manifest themselves by longitudinal vibration of the vehicle depends among other things on the elasticity in the drive train of the vehicle and, hence, on its natural frequency.

SUMMARY OF THE INVENTION

The object of the invention is to provide a device for obtaining signals for the control unit of an electronic fuel injection system, which device is free from the unwanted tendency toward torque fluctuation. The accomplishment of this object according to the invention is characterized in that at least one of the measuring means generating an analog control voltage signal is followed by a stabilizer of low-pass character for the voltage signal generated by it. The stabilizer is designed to dampen any a.c. voltage components that occur in the analog voltage signals because of non-operational influences.

It is especially desirable to have such a stabilizing means in the path of the signals both from the tachometer means and from the air measuring means. Thus, the invention in its most general form provides that those a.c. voltage components in the analog voltage signal that are generated by the measuring means in question and which are not attributable to operational influences, shall be at least damped. The stabilizing means must be designed to dampen frequencies from about 2 to 8 Hz, for such is the order of magnitude of the a.c. voltage components leading to the undesirable lengthwise vehicle vibrations. Due to the required low-pass character of the stabilizing means, however, changes in the instantaneous voltage signal due to operating maneuvers, for example changes in throttle setting, are practically undamped, apart from some distortion of the shape of the voltage rise and fall. As a result the damping provided according to the invention will not lead to any troublesome prolongation of the fuel injection system reaction time in response to control maneuvers.

The stabilizing means may be designed so that it achieves a symmetrical damping, thereby equally damping both half-waves of the a.c. voltage components to be damped. An especially desirable version of the invention, however, is characterized in that the stabilizing means is designed to dampen the a.c. voltage components asymmetrically. The asymmetry is chosen so that the resulting change in the mean analog voltage signal reaches the control unit as a signal increasing the fuel feed (fattening signal). The advantage of this arrangement lies in the fact that there is not only a damping of the opposed half-wave of the a.c. voltage component in unlike degree, but there is at the same time a shift in the mean of the a.c. voltage component due to the asymmetrical damping. This shift is utilized to obtain a signal increasing the fuel feed. Such a fattening of the mixture has the effect of eliminating the torque variations that occasion the undesirable longitudinal vehicle vibrations. In this embodiment of the invention when the a.c. voltage components first appear in the analog voltage signals emitted by either of the measuring means, signals are put into the control unit that immediately cause a fattening of the mixture which in turn counteracts the unwanted vibrations.

While this device employs a passive stabilizing means, another embodiment of the device is characterized in that there are a plurality of diodes in series, and an a.c. voltage amplifier for the a.c. voltage components is connected across at least one of them. This version thus provides an active stabilizing means. With suitable gain adjustment, it is possible to have a d.c. stabilized output voltage at the output of the stabilizing means that lies above the highest peaks of the input a.c. voltage component. In a passive stabilizing means, on the other hand, the stabilized output voltage is always lower than the highest peaks.

An especially economical embodiment with respect to the cost of parts, space and energy is distinguished in that the stabilizing means contains an RC combination as well as at least one diode in parallel with a resistance in the lengthwise branch of the RC combination. In the case of symmetrical damping of both half-waves of the a.c. voltage components, two diodes will be used with opposite polarity. With asymmetrical damping one diode is sufficient; but, it is also possible to employ two oppositely poled diodes with different value bias resistances. One of the bias resistances may have a value of zero. Independent of whether the stabilizing means is designed for symmetrical or asymmetrical damping, all a.c. voltage components with an amplitude smaller than the threshold voltage of the diode can reach the control unit only by way of the RC combination and only to an extent depending on the merit of the low pass filter. However, all voltage signals, as well as their a.c. components, whose amplitude of variation is greater than the theshold voltage of the diode in question will put the diode into the conductive state. This will produce a damping effect due to the voltage drop across the diode. In addition, if a stabilizing means with asymmetrical damping is present, e.g., where only one diode or two oppositely poled diodes with unlike bias resistances are used, there will be a displacement of the average of the a.c. voltage components, which in turn leads to a signal causing the fattening of the mixture.

BRIEF DESCRIPTION OF THE DRAWINGS

The foregoing and other features of the present invention will be more readily apparent from the following detailed description and drawings in which.

DESCRIPTION OF EXEMPLARY EMBODIMENTS

Figure 1:
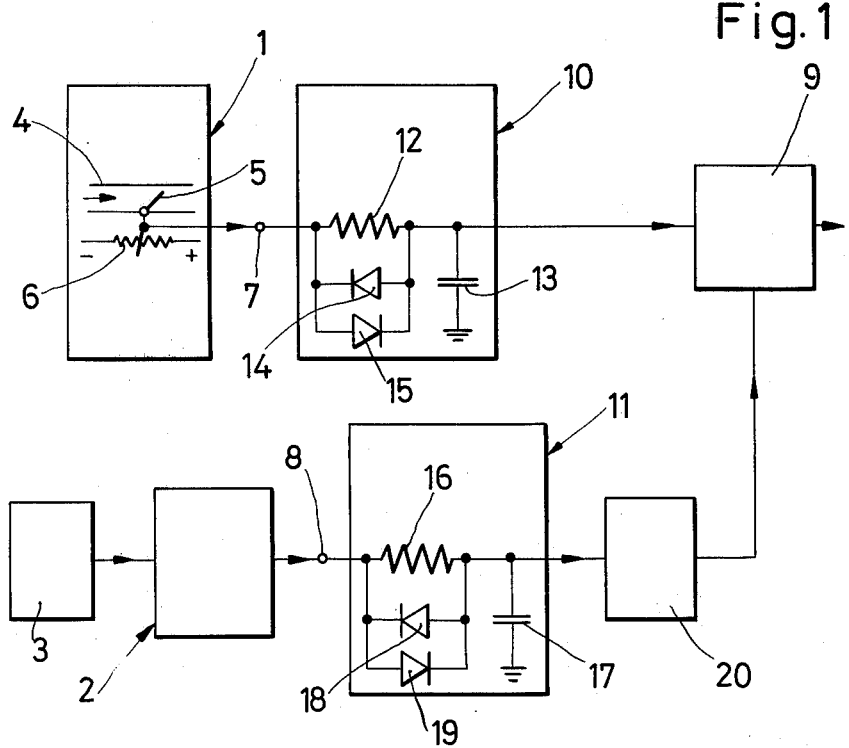
FIG. 1 is a block diagram of the device according to the invention with circuitry for a symmetrical damping stabilizing means.

In FIG. 1 an air flow gauge 1 and a tachometer gauge 2 are shown. The tachometer receives ignition impulses, for example, by way of a contact in the distributor 3. The air flow gauge 1 in this embodiment of the invention, by way of example, contains a flap 5 that is actuated by the flow of air in the intake 4 in a known manner. The flap sets the potentiometer 6 according to the air through-put at the time. At circuit points 7 and 8 there are analog voltage signals corresponding in amplitude to the air flow and the rotational speed of the engine, respectively.

In this exemplary embodiment of the invention, stabilizing means 10 and 11 are connected between a control unit 9 and airflow gauge 1 and speed gauge 2, respectively. In principle, it is possible alternatively to provide only one of these stabilizing means. In the embodiment represented in FIG. 1 by way of example, the stabilizing means 10 is comprised of the RC element, longitudinal resistance 12 and transverse condenser 13, and two oppositely poled diodes 14 and 15 arranged in parallel with the resistance 12. Correspondingly, the other stabilizing means 11 contains a longitudinal resistance 16 and a transverse condenser 17, which together form the RC element of the low-pass filter. The two oppositely poled diodes 18 and 19 are in parallel with the longitudinal resistance 16. Thus, for both gauges there are damping means which symmetrically dampen both half-waves of the a.c. voltage components in the analog voltage signals.

Since the invention employs analog voltage signals, while at least the signals corresponding to the engine speed in question must reach the control unit 9 in the form of pulse signals, the stabilizing means 11 is followed by a means 20 that transforms the analog voltage signal available at its input into simulated ignition pulses. A schematic of such a circuit is shown as 20 in FIG. 3.

Figure 2:
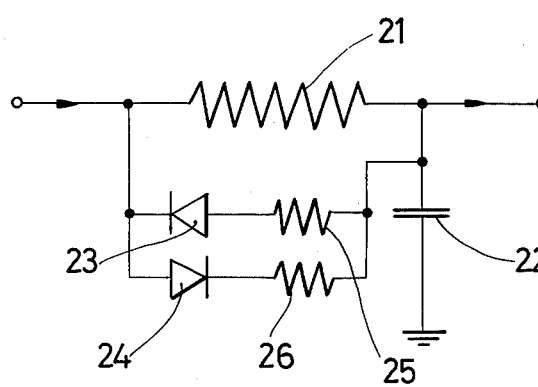
FIG. 2 represents a possible embodiment for an asymmetrical damping stabilizing means; p

The example of FIG. 2 serves to illustrate several possibilities for the structure of the stabilizing means designated by 10 and 11 in FIG. 1. As in FIG. 1, there is an RC element, containing the resistance 21 and transverse condenser 22, connected between one of the measuring means (left-hand terminal in FIG. 2) and the control unit (righ-hand terminal). In parallel with the lengthwise resistance 21 there are first and second series circuits with diodes 23 and 24, respectively, and bias resistances 25 and 26, respectively. The two diodes 23 and 24 are oppositely directed. All of the embodiments described with respect to FIG. 2 are similar in that the resistance 21 is very great compared to the resistances 25 and 26. If resistances 25 and 26 are equal and diodes 23 and 24 are of like type, the stabilizing means will have a symmetrical damping effect. However, if resistances 25 and 26 are different, there will be different dampings of the opposed half-waves of the unwanted a.c. voltage components of the analog voltage signals that are applied to the circuit. This inequality of the resistances may be carried to the extreme of omitting one of the two resistances. It is likewise possible to dispense with one of the two diodes 23 and 24, thereby achieving the maximum asymmetry of damping.

Figure 3:
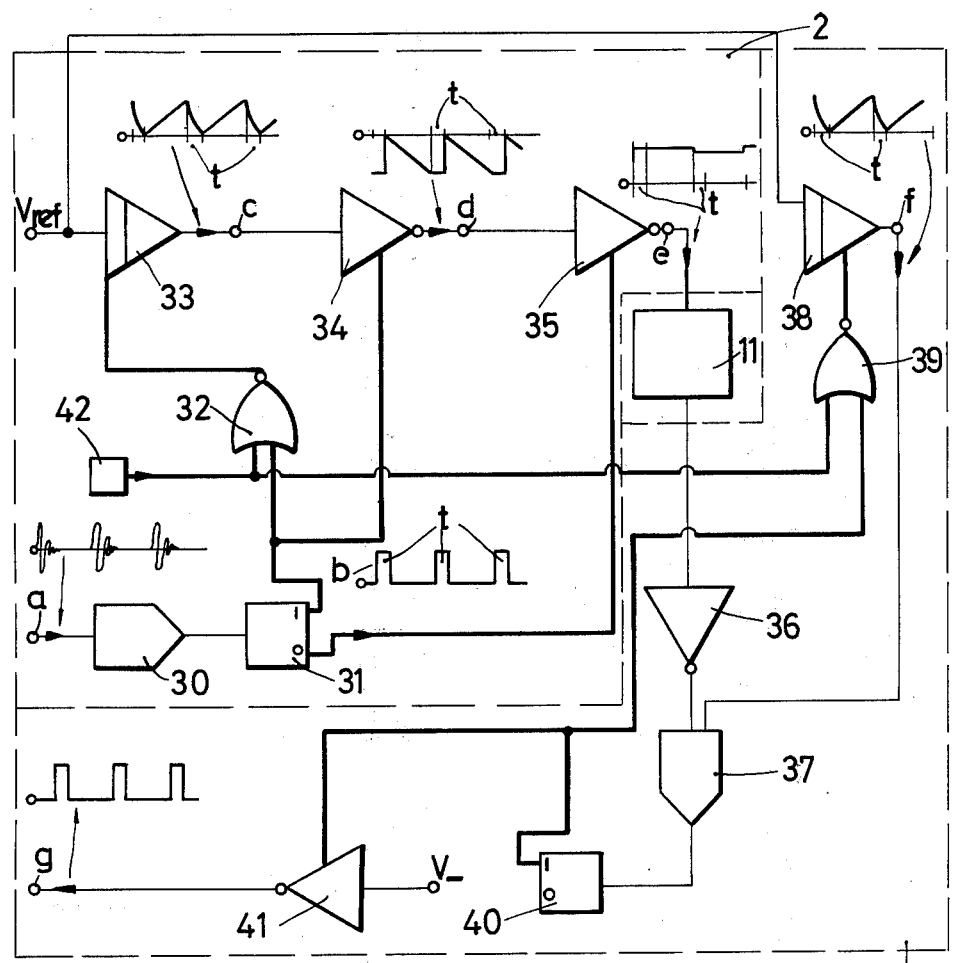
FIG. 3 shows a possible connection of a stabilizing means with other components of the device.

FIG. 3 shows a block diagram of the manner in which the stabilizing means 11 in FIG. 1 or alternatively any of the forms of the stabilizing means illustrated with reference to FIG. 2, is worked into the system as a whole. The dotted line boxes in FIG. 3 indicate the rotational speed measuring means 2 and the transducer 20 of FIG. 1.

The ignition impulses at terminal $a$ or pulses corresponding to them pass by way of the threshold circuit 30, which suppresses interference impulses, to the input of a first monostable flip-flop 31. Consequently, at the output $b$ of the monostable flip-flop 31 there results a series of rectangular pulses with a duration $t$, determined by the time constant of flip-flop 31. The time interval between the pulses corresponds to the interval between individual ignition impulses.

The output pulses of the first monostable flip-flop 31 are led to OR-gate 32 and are inverted and used to actuate a first integrator 33. A prerequisite for effective operation of the device is a low level starting signal at OR-gate 32 coming from the ignition switch 42 which is also applied to OR-gate 32. The actuation of the first integrator 33, which is connected by its input terminal at the left in the diagram to a reference voltage source $V_{ref}$ is thus such that the integrator 33 charges only during the period between output pulses from the first monostable flip-flop 31, and discharges during the periods of time $t$. The result is the voltage curve pictured over the output terminal $c$ of the first integrator 33. During the time $t$, track-store element 34 holds the integrated signal value constant as indicated by the graph over terminal $d$. Track-store element 35, however, emits a voltage at its output terminal $e$, that is analogous to the rotational speed and matches the trend of the peaks of the voltage at terminal $d$. The peak occurring in the voltage curve at terminal $d$ during each space of time $t$ is held constant in element 35 until the appearance of the next pulse of duration $t$.

The voltage that is analogous to the speed is now passed by way of stabilizing means 11 and inverter 36 to one input of the comparator 37. The other input of comparator 37 is connected to the output of a second integrator 38. The time constants of the two integrators 33 and 38 are the same. Similar to the first integrator the second integrator is actuated from a second monostable flip-flop 40 by way of a OR-gate 39. The two flip-flops 31 and 40 have equal time constants. The output voltage of the second integrator 38, whose input is connected directly to the same reference voltage as the input of the first integrator, is pictured above terminal *f*. As soon as this voltage becomes greater in absolute value than the voltage supplied by way of inverter 36, the comparator 37 emits a pulse to the monostable flip-flop 40 which in turn interrupts the operation of integration in the second integrator 38 during the period of time *t*. The output signals of the second monostable flip-flop 40 at the same time are applied to a switchable amplifier 41, which at its output *g* conveys rectangular pulses to the control unit in the form of simulated ignition impulses. These impulses result from inverting and amplifying the negative voltage input to amplifier 41 in response to flip-flop 40. Consequently, the circuit of FIG. 3 first converts the ignition impulses into an analog voltage signal, then stabilizes the analog signal according to the invention, and finally converts the analog voltage signal back into the pulse signals required to actuate the control unit.

The structure of the several circuit components need not be enlarged upon, as they belong to the prior art. In this connection, reference is made to the book *Electronics and Nulceonics Dictionary* of Cook and Markus, 1960 and to the circuit elements of the Analog/Hybrid Computing System manufactured by Electronic Associates, Inc. of West Long Branch, N.J. In particular, elements 34, 35 and 41 can be an inverting track-store, i.e., amplifiers which will produce an inverted version of the input and will hold its output voltage when a hold signal is received.

Figure 4:
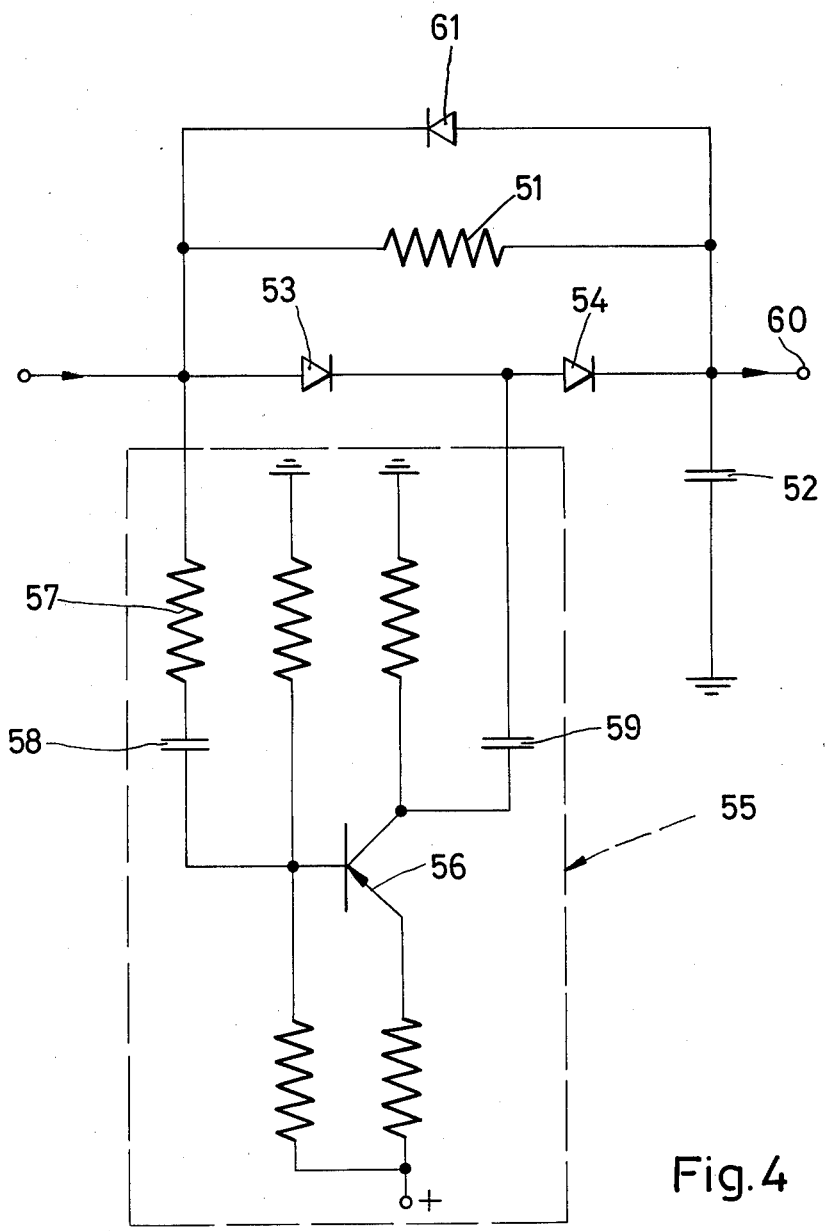
FIG. 4 is a possible embodiment for an active stabilizing means.

The stabilizing means of FIG. 4 contains, as an essential component, the RC element comprised of longitudinal resistance 51 and transverse condenser 52. In parallel with the resistance 51 in this example are two series connected diodes 53 and 54. Connected between the two diodes is the output of an a.c. voltage amplifier designated generally by 55. This amplifier contains, as an essential component, a transistor 56. The analog voltage signal to be stabilized with its a.c. voltage components is supplied to transistor 56 by way of bias resistance 57 and input condenser 58. The amplified output signal is picked up by way of the output condenser 59.

The gain of the amplifier 55 is so contrived that at the output 60 of the stabilizing means, there is a stabilized voltage output greater than the highest peaks of the a.c. voltage components. Too great an elevation of the a.c. voltage component by the amplifier 55 is prevented by the additional diode 61 which is in parallel with series diodes 53 and 54 and with resistance 51. Diode 61 has a threshold higher than the threshold voltage of diodes 53 and 54, and is oppositely directed.

The unwanted a.c. voltage components are thus themselves utilized to effect an increase in the amplitude of the d.c. voltage signals to be fed to the control unit, whereby a fattening of the mixture so as to counteract the longitudinal vehicle vibrations is achieved.

While the present invention has been particularly shown and described with reference to preferred embodiments thereof, it will be understood by those skilled in the art that various changes in form and details may be made therein without departing from the spirit and scope of the invention. In particular, while there is an airflow meter in all of the exemplary embodiments, this does not preclude application of the invention to an air meter in the form of an intake pressure gauge.

I claim:
1. An electronic fuel injection system of an internal combustion engine comprising:
    rotational speed measuring means for measuring the engine speed;
    air measuring means for measuring at least one of the flow of air supplied to the engine and the air intake pressure;
    analog signal means for assuring the creation of analog voltage signals from the output signals of said measuring means;
    at least one stabilizing means having a low pass transfer characteristic with a cut-off frequency in the range from about 2 to 8 Hz, said stabilizing means receiving the analog signal of at least one of said measuring means and producing a signal in which the a.c. voltage components resulting from longitudinal vehicle vibrations that occur in the analog voltage signal have been dampened; and
    a control unit for controlling the injection of fuel in response to at least the dampened signal from said stabilizing means.
2. A system according to claim 1 wherein the stabilizing means asymmetrically dampens the a.c. voltage components, the asymmetry being such that the resulting variation in the average value of the analog voltage signal arrives at the control unit as a fattening signal directing the control unit to increase the fuel supply.
3. A system according to claim 2 wherein the stabilizing means comprises:
    an RC combination of a resistance connected between the input and output of the stabilizing means and a capacitance connected across the output of the stabilizating means; and
    two series circuits comprising a diode and a bias resistance, both circuits being in parallel with the resistance of the RC combination, the diodes of the two circuits being oppositely directed and the bias resistances of the two circuits having a different values for determining the asymmetry.
4. A system according to claim 3 wherein one of the bias resistances has a value equal to zero.
5. A system according to claim 1 wherein the stabilizing means comprises an RC combination of a resistance connected between the input and output of the stabilizing means and a capacitance connected across the output of the stabilizing means.
6. A system according to claim 5 wherein the stabilizing means further includes at least one diode in parallel with the resistance of the RC combination.
7. A system according to claim 5 wherein the stabilizing means comprises a plurality of diodes in series between the input and output of the stabilizing means, and an a.c. voltage amplifier for the a.c. voltage components with its input connected to the input of the stabilizing means and its output connected between two of the plurality of diodes.
8. A system according to claim 7 further including at least one additional diode in parallel with the resistance, said additional diode having a higher threshold voltage than the plurality of diodes and being directed opposite to them.
9. A system according to claim 1 wherein the stabilizing means follows a rotational speed measuring means that is impressed with ignition impulses from the engine and which comprises:

a first monostable flip-flop that transposes the ignition impulses into pulses of predetermined duration;

a first integrator means actuated by the pulses of predetermined duration for producing a charging signal from a reference voltage within the pulse intervals and discharging during the pulses; and track-storage means for forming an analog voltage signal matching the peaks of the results of the integration by the first integrator means, said analog voltage being supplied to the stabilizing means.

10. A system according to claim 9 wherein the analog voltage signal leaving the stabilizing means is transformed into simulated ignition pulses by a transducer, said transducer comprising:

a second integrator means having the same time constant and reference voltage as the first integrator;

an amplitude comparator for comparing the outputs of the stabilizer means and the second integrator means; and a second monostable flip-flop having the same time constant as the first monostable flip-flop for generating simulated ignition signals in response to the output of the amplitude comparator and supplying them to the control unit, said simulated ignition pulses being used to actuate the second integrator.

* * * * *